US009335950B2

(12) United States Patent
Horn

(10) Patent No.: US 9,335,950 B2
(45) Date of Patent: May 10, 2016

(54) MULTIPLE STREAM COMPRESSION AND FORMATTING OF DATA FOR DATA STORAGE SYSTEMS

(71) Applicant: Western Digital Technologies, Inc., Irvine, CA (US)

(72) Inventor: Robert L. Horn, Yorba Linda, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 122 days.

(21) Appl. No.: 13/902,485

(22) Filed: May 24, 2013

(65) Prior Publication Data

US 2014/0281302 A1 Sep. 18, 2014

Related U.S. Application Data

(60) Provisional application No. 61/798,023, filed on Mar. 15, 2013.

(51) Int. Cl.
*G06F 3/06* (2006.01)

(52) U.S. Cl.
CPC .............. *G06F 3/0656* (2013.01); *G06F 3/061* (2013.01); *G06F 3/064* (2013.01); *G06F 3/0608* (2013.01); *G06F 3/068* (2013.01); *G06F 3/0614* (2013.01); *G06F 3/0659* (2013.01); *G06F 3/0638* (2013.01)

(58) Field of Classification Search
CPC ..... G06F 3/0656; G06F 3/0638; G06F 3/064; G06F 12/0246; G06F 2212/401; G06F 3/0679; G06F 3/0608
See application file for complete search history.

(56) References Cited

U.S. PATENT DOCUMENTS

| | | | |
|---|---|---|---|
| 5,465,186 A | 11/1995 | Bajorek et al. | |
| 5,861,661 A | 1/1999 | Tang et al. | |
| 6,228,689 B1 | 5/2001 | Liu | |
| 6,351,352 B1 | 2/2002 | Khan et al. | |
| 6,381,099 B1 | 4/2002 | Mei | |
| 6,382,499 B1 | 5/2002 | Satoh et al. | |
| 6,614,623 B2 | 9/2003 | Nakamura et al. | |
| 6,639,757 B2 | 10/2003 | Morley et al. | |
| 6,656,772 B2 | 12/2003 | Huang | |
| 6,757,137 B1 | 6/2004 | Mei | |
| 6,856,556 B1 | 2/2005 | Hajeck | |
| 6,992,862 B2 | 1/2006 | Childers et al. | |
| 7,075,701 B2 | 7/2006 | Novotny et al. | |
| 7,126,857 B2 | 10/2006 | Hajeck | |
| 7,154,708 B2 | 12/2006 | Chhabra et al. | |
| 7,245,458 B2 | 7/2007 | Zhang et al. | |
| 7,298,593 B2 | 11/2007 | Yao et al. | |

(Continued)

FOREIGN PATENT DOCUMENTS

WO 2011-081898 7/2011

OTHER PUBLICATIONS

International Search Report and Written Opinion dated Aug. 13, 2014 from related PCT Serial No. PCT/US2014/026863, 10 pages.

(Continued)

*Primary Examiner* — Kevin Verbrugge
*Assistant Examiner* — Francisco Grullon

(57) ABSTRACT

Embodiments of multiple stream compression and formatting of data for data storage systems are disclosed. In some embodiments, a data storage system can compress multiple streams of fixed sized host data before storing it on a media and format obtained variable sized compressed data for storing on the media that typically has fixed size storage granularity. One or more modules compress the incoming host data and create multiple output streams of fixed sized storage units that contain compressed data. The storage units are stored on the media. Capacity, reliability, and performance are thereby increased.

26 Claims, 6 Drawing Sheets

(56) References Cited

U.S. PATENT DOCUMENTS

| | | |
|---|---|---|
| 7,359,154 B2 | 4/2008 | Yao et al. |
| 7,372,669 B2 | 5/2008 | Deguchi et al. |
| 7,375,874 B1 | 5/2008 | Novotny et al. |
| 7,388,733 B2 | 6/2008 | Swanson et al. |
| 7,394,139 B2 | 7/2008 | Park et al. |
| 7,415,530 B2 | 8/2008 | Fallon |
| 7,430,136 B2 | 9/2008 | Merry, Jr. et al. |
| 7,440,236 B1 | 10/2008 | Bennin et al. |
| 7,447,807 B1 | 11/2008 | Merry et al. |
| 7,502,256 B2 | 3/2009 | Merry, Jr. et al. |
| 7,509,441 B1 | 3/2009 | Merry et al. |
| 7,515,240 B2 | 4/2009 | Lu et al. |
| 7,525,769 B2 | 4/2009 | Yao et al. |
| 7,596,643 B2 | 9/2009 | Merry, Jr. et al. |
| 7,652,890 B2 | 1/2010 | Ohsawa et al. |
| 7,653,778 B2 | 1/2010 | Merry, Jr. et al. |
| 7,685,337 B2 | 3/2010 | Merry, Jr. et al. |
| 7,685,338 B2 | 3/2010 | Merry, Jr. et al. |
| 7,685,374 B2 | 3/2010 | Diggs et al. |
| 7,697,102 B2 | 4/2010 | Hirakata et al. |
| 7,706,538 B1* | 4/2010 | Hughes et al. ............ 380/269 |
| 7,733,712 B1 | 6/2010 | Walston et al. |
| 7,764,467 B2 | 7/2010 | Hanya et al. |
| 7,765,373 B1 | 7/2010 | Merry et al. |
| 7,876,664 B2 | 1/2011 | Tsukagoshi et al. |
| 7,898,855 B2 | 3/2011 | Merry, Jr. et al. |
| 7,912,991 B1 | 3/2011 | Merry et al. |
| 7,936,603 B2 | 5/2011 | Merry, Jr. et al. |
| 7,962,792 B2 | 6/2011 | Diggs et al. |
| 8,015,692 B1 | 9/2011 | Zhang et al. |
| 8,030,576 B2 | 10/2011 | Kamei et al. |
| 8,054,879 B2 | 11/2011 | Fallon et al. |
| 8,078,918 B2 | 12/2011 | Diggs et al. |
| 8,090,899 B1 | 1/2012 | Syu |
| 8,090,936 B2 | 1/2012 | Fallon et al. |
| 8,095,851 B2 | 1/2012 | Diggs et al. |
| 8,108,692 B1 | 1/2012 | Merry et al. |
| 8,111,483 B2 | 2/2012 | Arai |
| 8,122,185 B2 | 2/2012 | Merry, Jr. et al. |
| 8,127,048 B1 | 2/2012 | Merry et al. |
| 8,135,903 B1 | 3/2012 | Kan |
| 8,151,020 B2 | 4/2012 | Merry, Jr. et al. |
| 8,161,227 B1 | 4/2012 | Diggs et al. |
| 8,166,245 B2 | 4/2012 | Diggs et al. |
| 8,189,407 B2* | 5/2012 | Strasser et al. ......... 365/189.09 |
| 8,243,525 B1 | 8/2012 | Kan |
| 8,254,172 B1 | 8/2012 | Kan |
| 8,261,012 B2 | 9/2012 | Kan |
| 8,266,496 B2* | 9/2012 | Flynn et al. .................. 714/758 |
| 8,296,625 B2 | 10/2012 | Diggs et al. |
| 8,312,207 B2 | 11/2012 | Merry, Jr. et al. |
| 8,316,176 B1 | 11/2012 | Phan et al. |
| 8,341,339 B1 | 12/2012 | Boyle et al. |
| 8,375,151 B1 | 2/2013 | Kan |
| 8,392,635 B2 | 3/2013 | Booth et al. |
| 8,397,107 B1 | 3/2013 | Syu et al. |
| 8,407,449 B1 | 3/2013 | Colon et al. |
| 8,423,722 B1 | 4/2013 | Deforest et al. |
| 8,433,858 B1 | 4/2013 | Diggs et al. |
| 8,443,167 B1 | 5/2013 | Fallone et al. |
| 8,447,920 B1 | 5/2013 | Syu |
| 8,458,435 B1 | 6/2013 | Rainey, III et al. |
| 8,478,930 B1 | 7/2013 | Syu |
| 8,489,854 B1 | 7/2013 | Colon et al. |
| 8,503,237 B1 | 8/2013 | Horn |
| 8,521,972 B1 | 8/2013 | Boyle et al. |
| 8,549,236 B2 | 10/2013 | Diggs et al. |
| 8,583,835 B1 | 11/2013 | Kan |
| 8,601,311 B2 | 12/2013 | Horn |
| 8,601,313 B1 | 12/2013 | Horn |
| 8,612,669 B1 | 12/2013 | Syu et al. |
| 8,612,804 B1 | 12/2013 | Kang et al. |
| 8,615,681 B2 | 12/2013 | Horn |
| 8,638,602 B1 | 1/2014 | Horn |
| 8,639,872 B1 | 1/2014 | Boyle et al. |
| 8,683,113 B2 | 3/2014 | Abasto et al. |
| 8,700,834 B2 | 4/2014 | Horn et al. |
| 8,700,950 B1 | 4/2014 | Syu |
| 8,700,951 B1 | 4/2014 | Call et al. |
| 8,706,985 B1 | 4/2014 | Boyle et al. |
| 8,707,104 B1 | 4/2014 | Jean |
| 8,713,066 B1 | 4/2014 | Lo et al. |
| 8,713,357 B1 | 4/2014 | Jean et al. |
| 8,719,531 B2 | 5/2014 | Strange et al. |
| 8,724,422 B1 | 5/2014 | Agness et al. |
| 8,725,931 B1 | 5/2014 | Kang |
| 8,745,277 B2 | 6/2014 | Kan |
| 8,751,728 B1 | 6/2014 | Syu et al. |
| 8,769,190 B1 | 7/2014 | Syu et al. |
| 8,769,232 B2 | 7/2014 | Suryabudi et al. |
| 8,775,720 B1 | 7/2014 | Meyer et al. |
| 8,782,327 B1 | 7/2014 | Kang et al. |
| 8,788,778 B1 | 7/2014 | Boyle |
| 8,788,779 B1 | 7/2014 | Horn |
| 8,788,880 B1 | 7/2014 | Gosla et al. |
| 8,793,429 B1 | 7/2014 | Call et al. |
| 2001/0017749 A1 | 8/2001 | Stefansky |
| 2005/0030670 A1 | 2/2005 | Ando et al. |
| 2005/0243472 A1 | 11/2005 | Kamigama et al. |
| 2006/0098347 A1 | 5/2006 | Yao et al. |
| 2006/0146262 A1 | 7/2006 | Yu et al. |
| 2006/0157869 A1 | 7/2006 | Huang et al. |
| 2007/0246251 A1 | 10/2007 | Shiraishi et al. |
| 2008/0002303 A1 | 1/2008 | Wang et al. |
| 2008/0016281 A1 | 1/2008 | Gower et al. |
| 2008/0068757 A1 | 3/2008 | Kamigama et al. |
| 2008/0088975 A1 | 4/2008 | Bennin et al. |
| 2008/0140724 A1* | 6/2008 | Flynn et al. .............. 707/104.1 |
| 2008/0225439 A1 | 9/2008 | Komura |
| 2009/0151994 A1 | 6/2009 | Ohsawa et al. |
| 2009/0190760 A1 | 7/2009 | Bojinov et al. |
| 2009/0211789 A1 | 8/2009 | Yeates et al. |
| 2009/0253233 A1 | 10/2009 | Chang et al. |
| 2010/0118444 A1 | 5/2010 | Rothenberg et al. |
| 2010/0174849 A1 | 7/2010 | Walston et al. |
| 2010/0176827 A1 | 7/2010 | Yamazaki et al. |
| 2010/0188778 A1 | 7/2010 | Castagna |
| 2010/0195474 A1 | 8/2010 | Tsukuda et al. |
| 2010/0250793 A1 | 9/2010 | Syu |
| 2011/0099323 A1 | 4/2011 | Syu |
| 2011/0252183 A1 | 10/2011 | Cho et al. |
| 2011/0283049 A1 | 11/2011 | Kang et al. |
| 2011/0317309 A1 | 12/2011 | Shum et al. |
| 2012/0005557 A1 | 1/2012 | Mardiks et al. |
| 2012/0067626 A1 | 3/2012 | Mizutani |
| 2012/0260009 A1 | 10/2012 | Lu et al. |
| 2012/0260020 A1 | 10/2012 | Suryabudi et al. |
| 2012/0265737 A1* | 10/2012 | Potkonjak ................. 707/693 |
| 2012/0278531 A1 | 11/2012 | Horn |
| 2012/0284460 A1 | 11/2012 | Guda |
| 2012/0324191 A1 | 12/2012 | Strange et al. |
| 2013/0132638 A1 | 5/2013 | Horn et al. |
| 2013/0145106 A1 | 6/2013 | Kan |
| 2013/0290793 A1 | 10/2013 | Booth et al. |
| 2014/0059405 A1 | 2/2014 | Syu et al. |
| 2014/0101369 A1 | 4/2014 | Tomlin et al. |
| 2014/0115427 A1 | 4/2014 | Lu |
| 2014/0133220 A1 | 5/2014 | Danilak et al. |
| 2014/0136753 A1 | 5/2014 | Tomlin et al. |
| 2014/0149826 A1 | 5/2014 | Lu et al. |
| 2014/0157078 A1 | 6/2014 | Danilak et al. |
| 2014/0181432 A1 | 6/2014 | Horn |
| 2014/0223255 A1 | 8/2014 | Lu et al. |
| 2014/0281146 A1 | 9/2014 | Horn |

OTHER PUBLICATIONS

Marvin R. Deforest, et al., U.S. Appl. No. 14/010,350, filed Aug. 26, 2013, 31 pages.

Robert L. Horn, U.S. Appl. No. 13/902,504, filed May 24, 2013, 33 pages.

\* cited by examiner

MULTIPLE STREAM COMPRESSION AND FORMATTING OF DATA FOR DATA STORAGE SYSTEMS

CROSS REFERENCE TO RELATED APPLICATION

This application claims priority to a provisional U.S. Patent Application No. 61/798,023, filed on Mar. 15, 2013, the disclosure of which is hereby incorporated by reference in its entirety. This application is also related to co-pending U.S. patent application Ser. No. 13/902,504, entitled "COMPRESSION AND FORMATTING OF DATA FOR DATA STORAGE SYSTEMS," WD Ref: T6171, filed on the same day, the disclosure of which is hereby incorporated by reference in its entirety.

BACKGROUND

1. Technical Field

This disclosure relates to data storage systems for computer systems. More particularly, the disclosure relates to multiple stream compression and formatting of data for storage systems.

2. Description of the Related Art

Modern computer systems continually require increases in data storage system capacity, reliability, and performance. In 1981, a typical hard disk drive used in a personal computer had capacity of about 10 megabytes (MB). Today, capacities of hard disk drives are measured in terabytes (TB). Shingled magnetic recording is utilized in order to increase capacity of magnetic storage. In addition, modern disk drives often include solid state memory to increase performance. It is desirable to provide mechanisms and architectures for increasing capacity, reliability, and performance of data storage systems.

BRIEF DESCRIPTION OF THE DRAWINGS

Systems and methods that embody the various features of the invention will now be described with reference to the following drawings, in which.

DETAILED DESCRIPTION

Figure 1:
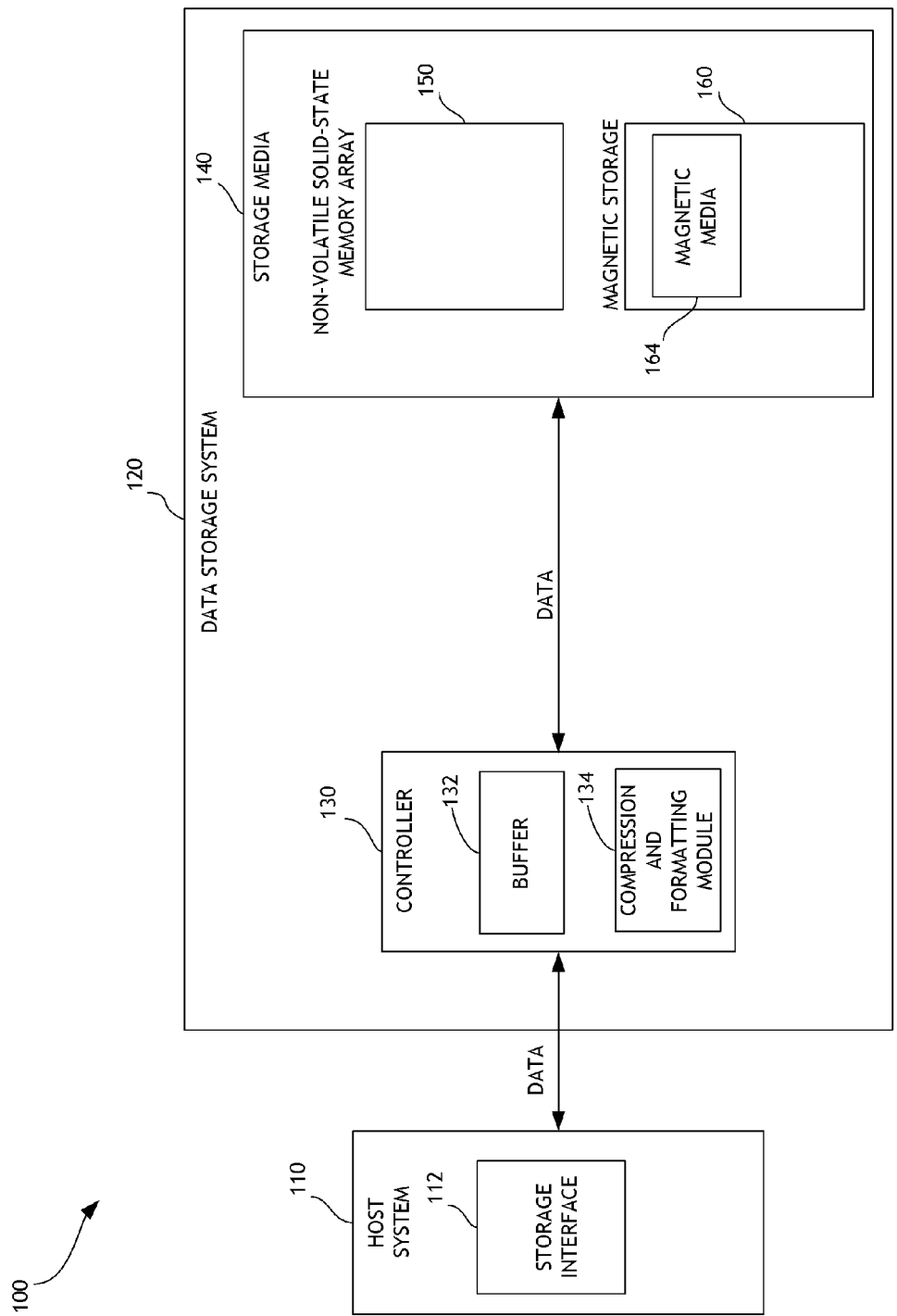
FIG. 1 illustrates a combination of a host system and a data storage system according to some embodiments of the invention.

While certain embodiments are described, these embodiments are presented by way of example only, and are not intended to limit the scope of protection. Indeed, the novel methods and systems described herein may be embodied in a variety of other forms. Furthermore, various omissions, substitutions, and changes in the form of the methods and systems described herein may be made without departing from the scope of protection.

Overview

Data storage systems can utilize compression techniques in order to meet the demand for increased capacity, reliability, and performance. Compressing host system data before storing it in a data storage system typically causes compressed data to have smaller size than the original, non-compressed data provided by a host system. Accordingly, fixed sized host data units provided by the host system become variable sized data units after compression. Numerous challenges exist with storing and retrieving such variable sized data. For example, storing variable sized data in a data storage system media may necessitate making considerable changes to the way the data storage system stores data and keeps track of the stored data. As another example, because the host system usually expects fixed size data to be returned during data retrieval, considerable changes to data retrieval mechanisms may also be necessitated. As yet another example, data storage system throughput can be significantly enhanced with consecutive logical addresses are stored physically adjacent on the media. However, it is common for a sequence of write commands from a host system to include multiple, interleaved streams of consecutive logical addresses. De-interleaving such streams of host data in a data storage system utilizes compression causes further difficulties because compressed data spans multiple physical storage locations and is variable sized.

In some embodiments, mechanisms for compression and formatting of host data (or user data) for storing in data storage systems are provided. A data storage system can compress fixed sized data before storing it on a media and format obtained variable sized compressed data for storing on the media that typically has fixed size storage granularity, such as sectors for magnetic media and pages for non-volatile solid-state memory. One or more modules can compress incoming host data and create an output stream of fixed size "virtual" storage units (or storage units) containing one or more compressed host data units, error correction and detection code (EDC) information, and metadata for decoding the logical contents of the storage units. Virtual storage units serve as fixed sized containers for compressed host data.

In some embodiments, interleaved host write data streams are de-interleaved, compressed, and formatted using multiple write streams and/or virtual data streams. Multiple write streams can independently de-interleave host data, and multiple virtual data streams can independently format compressed (or uncompressed) data. De-interleaving involves separating sequential host data writes from non-sequential host data writes and multiple interleaved sequential host writes from each other. Sequential or substantially sequential compressed host data is stored in adjacent or substantially adjacent physical memory locations in the media. In some embodiments, context of one or more write streams can be saved and restored on demand, such as when the host system provides additional host data that should be handled by a particular write stream.

System Overview

FIG. 1 illustrates a combination 100 of a host system and a data storage system according to some embodiments of the invention. As is shown, the data storage system 120 (e.g., a solid-state drive) includes a controller 130 and storage media 140. Media 140 includes a non-volatile solid-state memory array 150. The solid-state memory array 150 may comprise flash integrated circuits, Chalcogenide RAM (C-RAM), Phase Change Memory (PC-RAM or PRAM), Programmable Metallization Cell RAM (PMC-RAM or PMCm), Ovonic Unified Memory (OUM), Resistance RAM (RRAM), NAND memory (e.g., single-level cell (SLC) memory, multi-level cell (MLC) memory, or any combination thereof), NOR memory, EEPROM, Ferroelectric Memory (FeRAM), Magnetoresistive RAM (MRAM), other discrete NVM (non-volatile memory) chips, or any combination thereof. Media 140 also includes magnetic storage 160, which comprises magnetic recording media 164. In one embodiment, magnetic storage 160 utilizes shingled magnetic recording. Storage media 140 can further comprise other types of storage. In some embodiments, the storage media 140 can comprise only one of solid-state memory array 140 or the magnetic storage 160.

The controller 130 can be configured to receive data and/or storage access commands from a storage interface module 112 (e.g., a device driver) of a host system 110. Storage access commands communicated by the storage interface 112 can include write data and read data commands issued by the host system 110. Read and write commands can specify a logical address (e.g., logical block addresses or LBAs) used to access the data storage system 120. The controller 130 can execute the received commands in the media 140.

Data storage system 120 can store data communicated by the host system 110. In other words, the data storage system 120 can act as memory storage for the host system 110. To facilitate this function, the controller 130 can implement a logical interface. The logical interface can present to the host system 110 data storage system's memory as a set of logical addresses (e.g., contiguous address) where user data can be stored. Internally, the controller 130 can map logical addresses to various physical locations or addresses in the media 140. The controller 130 includes a buffer 132, which can comprise volatile memory, such as random access memory (RAM) (e.g., DRAM, SRAM, etc.). In one embodiment, the buffer 132 is external to the controller 130. The controller 130 also includes a compression and formatting module 134 configured to compress and format host data for storing in the media 140, and decompress and format stored data for providing to the host system 110. The compression and formatting module 134 can utilize the buffer 132 for storing and retrieving data while performing compression and/or formatting tasks, including multiple stream compression and/or formatting. In one embodiment, the compression and formatting module 134 is implemented in hardware, such as a system on-chip (SoC) hardware module. Hardware implementation can be realized using an application specific integrated circuit (ASIC), field-programmable gate array (FPGA), or a combination thereof. In another embodiment, the compression and formatting module 134 can be implemented in firmware or as a combination of hardware and firmware.

In some embodiments, the host system 110 stores in the data storage system 120 and the data storage system returns to the host system data formatted as one or more logical host data units. Logical host data units can span ranges of logical addresses, with each logical address corresponding to a physical location in the media 140. Host data units can be fixed sized data units of any suitable size, such as 512 bytes, 1024 bytes (1 KB), 2048 bytes (2 KB), 4096 bytes (4 KB), and the like. In one embodiment, 512 byte data units or sectors are utilized by the host system 110. In some embodiments, the media 140 is divided into fixed sized physical media storage units (or memory data units) of a suitable size, such as 512 bytes, 1024 bytes (1 KB), 2048 bytes (2 KB), 4096 bytes (4 KB), and the like. Physical media storage units can correspond to the smallest programmable and readable portion of memory and can span physical addresses of individual memory locations. In some embodiments, different media types include media storage units of different sizes. For example, the solid-state memory array 150 can be divided into dies, blocks, and pages, such as 2 KB pages, and the magnetic recording media 164 can be divided into tracks, clusters, and sectors, such as 512 byte sectors.

Compression and Formatting

Figure 2:
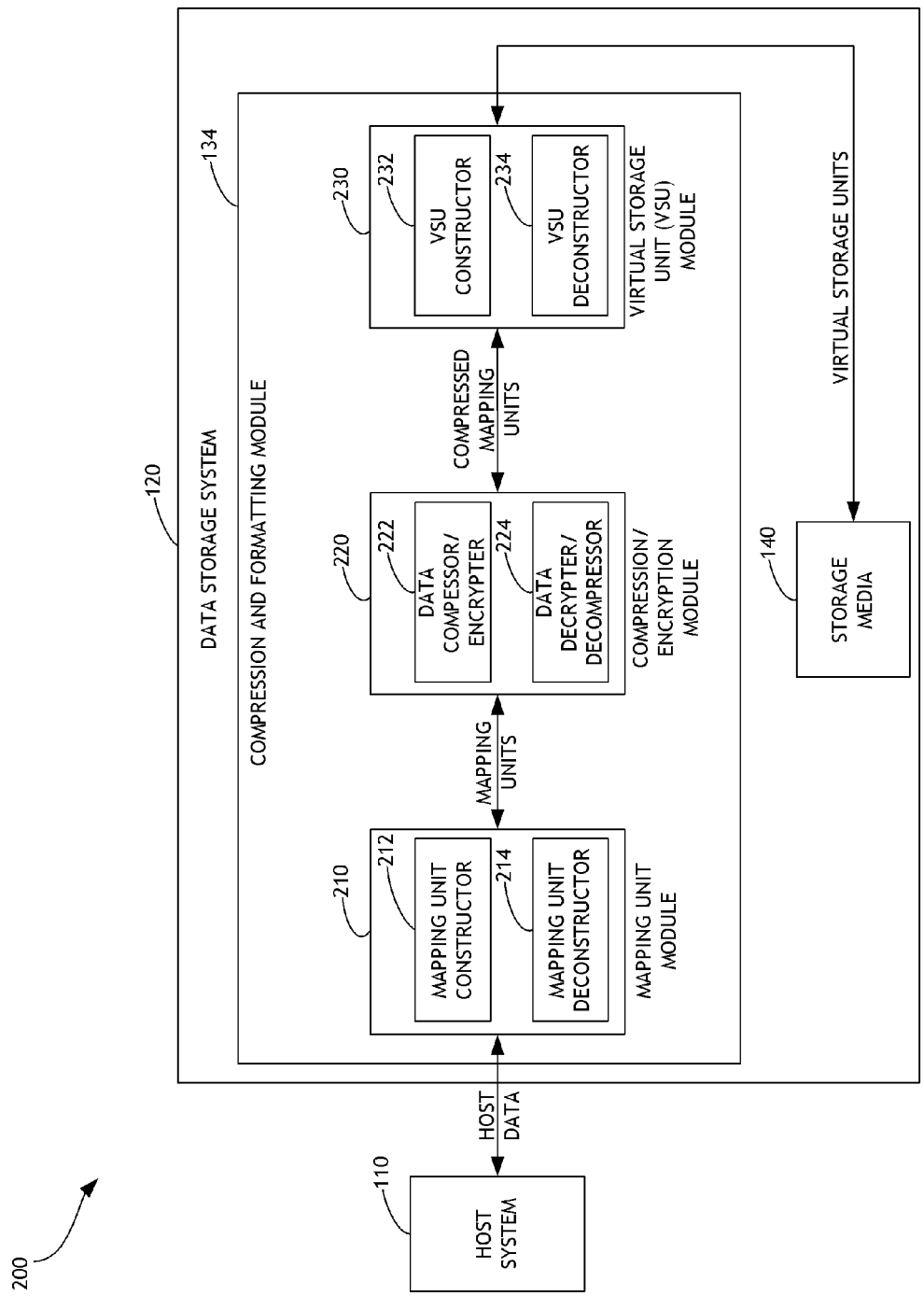
FIG. 2 illustrates compression and formatting utilized by a data storage system according to some embodiments of the invention.

FIG. 2 illustrates compression and formatting 200 utilized by the data storage system 120 according to some embodiments of the invention. The host system 110 provides host data (or user data) for storing in the data storage system 120. The host system 110 can provide host data in form of fixed sized host data units, such as 512 byte logical sectors. The host system 110 can provide host data as part of one or more write data commands. On the data storage system 120 side, the compression and formatting module 134 compresses and formats host data units for storage in the media 140.

In some embodiments, host data units are processed by a mapping unit module 210. A mapping unit can be selected as an integer multiple of the host data unit size, such as $N \times s_1$ or $s_1/N$, where $s_1$ is the host data unit size (e.g., 512 bytes) and N is an integer. The size of the mapping unit can be selected so as to achieve an optimal or substantially optimal balance between reduction of storage space gained from compression and latency associated with accessing compressed and formatted data stored in the media. In some embodiments, a mapping unit constructor 212 assembles one or more host data units into one or more mapping units. In some embodiments, the mapping unit constructor 212 assembles consecutive or sequential host data units into one or more mapping units. In one embodiment, consecutive or sequential host data units are associated with sequential logical addresses. In addition, aligned host data units of the size equal to the integer multiple size of the host data unit size can be stored into a mapping unit. For example, suppose that the host system 110 sends write data commands with host data units corresponding to 512-byte logical sectors 0-7, 8-15, and 16-23. Suppose that the mapping unit constructor 212 is configured to assemble aligned 4 KB of host data (or eight aligned 512-byte logical sectors) into a mapping unit, where "aligned" refers to alignments of the starting (and ending) logical addresses as well as the size. For the above example, the mapping unit constructor 212 generates three mapping units containing host data units for logical sectors 0-7, 8-15, and 16-23. Continuing the previous example, suppose that the host system 110 sends write data commands with host data units corresponding to logical sectors 1-8. These host data units are associated with eight logical sectors and have 4 KB aggregate size. However, these host data units are not aligned with chunks of eight logical sectors (e.g., a media storage unit boundary line is crossed). That is, the starting logical sector of these host data units is 1, not 0. Accordingly, the mapping unit constructor 212 generates two separate partial mapping units as discussed below: the first corresponding to logical sectors 1-7 and the second corresponding to logical sector 8. In some embodiments, the mapping units constructor 212 assembles non-aligned host data units into mapping units. In some embodiments, the mapping unit constructor 212 assembles non-consecutive or consecutive and non-consecutive host data units into mapping units.

In some embodiments, the mapping unit constructor 212 generates partial mapping units (or PMUs) that comprise less host data than the selected or target mapping unit size. For example, suppose that the host system sends write data commands with host data units corresponding to 512-byte logical sectors, 0-10 and that the mapping unit constructor 212 is configured to assemble aligned 4 KB of host data (or eight aligned 512-byte logical sectors) into a mapping unit. The mapping unit constructor 212 generates a first full or complete mapping unit corresponding to host data units for logical sectors 0-7 and a second partial mapping unit corresponding to host data units for logical sectors 8-10. Partial mapping unit corresponding to data associated with logical sector 8-10 can be later integrated into a full mapping unit when the host system 110 writes data into logical sectors 11-15.

In some embodiments, mapping units (full or partial) constructed by the mapping unit module 210 are compressed, and optionally encrypted, by the compression and encryption module 220. In some embodiments, a data compression module 222 first compresses and then, optionally, encrypts the compressed data. Encryption is performed after compression as encrypted data is randomized and may not be compressible. In some embodiments, lossless compression is used, such as Lempel-Ziv-Welch (LZW) compression. Compressed mapping unit(s) generated by the data compression module 222 can be referred to as compressed payload. In some embodiments, partial mapping units are not compressed in order to make later integration into full mapping units more efficient. In some embodiments, full mapping units are not compressed. For example, one uncompressed mapping unit can be stored as a virtual storage unit, as explained below.

In some embodiments, compressed (and optionally encrypted) mapping unit data has a size that is smaller than that of an uncompressed mapping unit. Accordingly, compressed mapping units can have variable size. However, as explained above, the media 140 can have fixed size storage granularity, such as fixed sized media storage units (or memory data units). For example, the solid-state memory array 150 can comprise memory pages, with a page being the smallest programmable and/or retrievable memory unit. As another example, the magnetic recording media 164 can comprise sectors, with a sector being the smallest programmable and/or retrievable memory unit. Compressed mapping units are provided to the virtual storage unit module 230 that assembles one or more compressed mapping units (or, in some embodiments, uncompressed mapping units) into fixed sized storage units for storing in the media.

In some embodiments, a virtual storage unit constructor 232 is configured to assemble compressed mapping units into virtual storage units having a size that is aligned with the size of the media storage unit. For example, the size of the virtual storage unit can be an integer multiple of the media storage unit, such as $N \times s_2$ or $s_2/N$, where $s_2$ is the media storage unit size and N is an integer. In one embodiment, the size of the virtual storage unit is the same as the size of the media storage unit, such as 4 KB. In another embodiment, the size of the virtual storage unit is selected such that one or more compressed mapping units are assembled into a virtual storage unit. In some embodiments, different sizes of media storage units can be utilized for different types of media. As is illustrated in FIG. 1, the data storage system 120 includes solid-state memory 140 and magnetic storage 160, which can have different sizes of media storage units. For example, solid-state memory 140 can include memory pages that are 8 KB in size, while the magnetic recording media 164 can include 4 KB sectors. The virtual storage unit constructor 232 can assemble two types of virtual storage units: 8 KB storage unit for being programmed in the solid-state memory 140 and 4 KB storage unit for being written in the magnetic recording media 164.

In some embodiments, a virtual storage unit that includes one or more compressed (or uncompressed) data units is padded with filler data so that the size of the virtual storage unit is aligned with the size of a corresponding media storage unit (e.g., corresponding to the media where the virtual storage unit will be stored). For example, suppose that the size of a compressed mapping unit is 3.5 KB and 4 KB virtual storage units are used. The virtual storage unit constructor 232 can assemble 3.5 KB compressed mapping unit along with 0.5 KB (or 512 bytes) of filler data into a virtual storage unit. As another example, suppose that the combined size of two compressed mapping units is 3.7 KB and 4 KB virtual storage units are used. The virtual storage unit constructor 232 can assemble the two compressed mapping units having combined size of 3.7 KB along with 0.3 KB of filler data into a virtual storage unit. Filler data can comprise one or more suitable values, such as all zero values.

In some embodiments, compressed mapping units can be split across multiple virtual storage units. Compressed mapping units can include compressed payload or uncompressed payload (e.g., partial mapping unit payload may not be compressed). For example, suppose that a first compressed mapping unit is sized 1 KB, a second compressed mapping unit is sized 3.5 KB, a third compressed mapping unit is sized 3 KB, and 4 KB virtual storage units are used. The virtual storage unit constructor 232 can assemble the first compressed mapping unit (sized 1 KB) and 3 KB of the second compressed mapping unit (or split compressed mapping unit) into a first virtual storage unit. Further, the virtual storage unit constructor 232 can assemble the remaining 0.5 KB of the second compressed mapping unit (or remainder compressed mapping unit), third compressed mapping unit (sized 3 KB), and 0.5 KB of filler data into a second virtual storage unit.

In some embodiments, multiple compressed mapping units assembled into a virtual storage unit include only sequential host data units. For example, a first compressed mapping unit that includes host data units corresponding to logical 512-byte sectors 0-7 and a second compressed mapping unit that includes host data units corresponding to logical sectors 8-15 are combined into a virtual storage unit. In some embodiments, virtual storage units can include non-sequential host data units. For example, a first compressed mapping unit that includes host data units corresponding to logical sectors 0-7 and a second compressed mapping unit that includes host data units corresponding to logical sectors 32-39 are combined into a virtual storage unit.

In some embodiments, the mapping unit module 210, compression and encryption module 220, and virtual storage unit module 230 operate on data stored in the buffer 132. That is, mapping units, compressed mapping units, and virtual storage units are created and manipulated in the buffer 132. Assembled virtual storage units can be stored in the non-volatile media 140.

In some embodiments, reading data comprises performing the inverse of the operations associated with writing data. In response to a read data command received from the host system, the command including logical addresses for host data to be retrieved, the virtual storage unit deconstructor 234 identifies or locates in the media 140 (and/or in the buffer 132) one or more virtual storage units with the host data to be retrieved. As explained below, the virtual storage unit deconstructor 234 can use mapping data for performing the identification. The virtual storage unit deconstructor 234 identifies one or more compressed mapping units from the retrieved one or more virtual storage units, the one or more compressed mapping units containing host data to be retrieved. Data decrypter and decompressor 224 decrypts (if the data is encrypted) and decompresses (if the data is compressed) the payloads of the one or more compressed mapping units to obtain one or more mapping units containing host data to be retrieved. Mapping unit deconstructor 214 unpacks host data to be retrieved from the one or more mapping units. Host data to be retrieved is returned to the host system 110.

In some embodiments, one or more of the mapping unit module 210, compression and encryption module 220, and virtual storage unit module 230 are implemented in hardware, such as in in one or more a system on-chip (SoC) hardware modules. Hardware implementation can be realized using an application specific integrated circuit (ASIC), field-programmable gate array (FPGA), or a combination thereof. In another embodiment, modules 210, 220, and 230 can be implemented in firmware or as a combination of hardware and firmware.

Compression and Formatting and Formatting Using Multiple Streams

Figure 3:
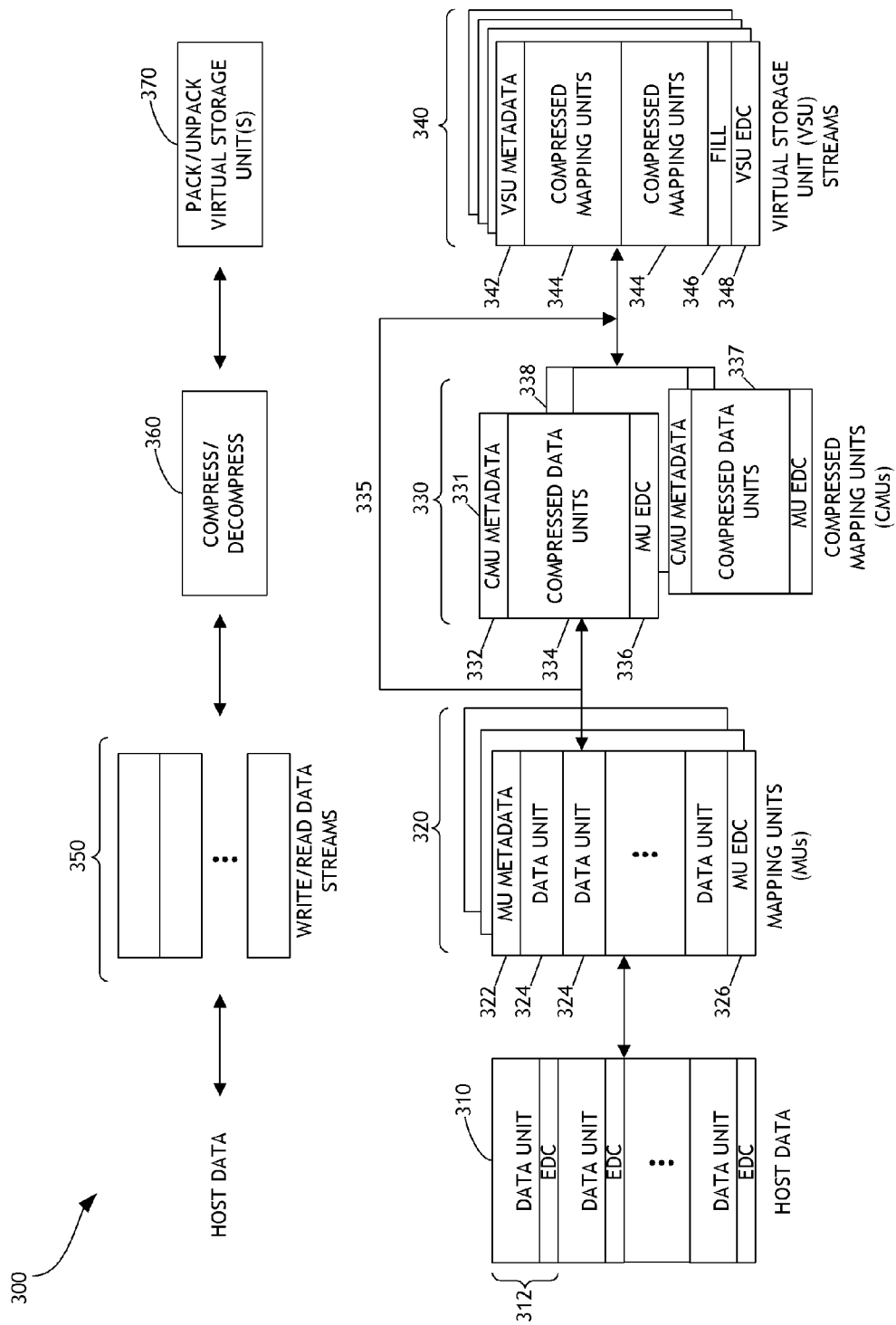
FIG. 3 illustrates compression and formatting data flow utilized by a data storage system according to some embodiments of the invention.

FIG. 3 illustrates compression and formatting data flow 300 utilized by a data storage system according to some embodiments of the invention. The data flow 300 can be implemented by the controller 130 and/or the compression and formatting module 134. Host data 310 is received from the host system 110 as a set of host data units 312. In one embodiment, a host data unit 312 is a logical sector, such as a 512-byte logical sector. A host data unit 312 includes host (or user) data and error correction and detection (EDC) data that enables error detection and/or reconstruction of the host data. In one embodiment, EDC data can be parity data checksum, cyclic redundancy check (CRC) data, or a suitable error correction code. In one embodiment, a 512-byte logical sector of host data includes 4 bytes of EDC data.

In some embodiments, host data 310 is assembled into one or more mapping units 320 as discussed above. This can be performed by the mapping unit module 210. As explained above, a mapping unit 320 can be selected as an integer multiple of the host data unit size. In some embodiments, a mapping unit 320 includes one or more host data units 324 (which collectively make up a mapping unit payload), mapping unit metadata 322, and mapping unit EDC 326. Mapping unit metadata 322 can include the following information: payload type (e.g., compressed or uncompressed), count (or number) of host data units in the payload, logical addresses of one or more host data units in the payload, and payload length. In other embodiments, metadata 322 can include additional or alternative fields. In some embodiments, when the mapping unit module 210 assembles sequential host data units into a mapping unit, the logical address of the first host data unit in the payload and the host data unit size are sufficient to identify and locate all host data units in the payload. For example, if host data units corresponding to 512-byte logical sectors 0-7 are assembled into a 4 KB mapping unit, starting logical address associated with logical sector 0 and logical sector size (512 bytes) are sufficient to describe all logical sectors. The count of the host units in the payload in this case is set to 8. As another example, if host data units corresponding to 512-byte logical sectors 0-4 are assembled into a partial mapping unit, the count of the host units in the payload is set to 5.

In some embodiments, mapping unit EDC 326 is calculated for the entire payload of the mapping unit. The size of the mapping unit EDC 326 is smaller than the aggregate size of EDC data associated with the host data units 324 in the payload. For example, suppose that 512-byte logical sector of host data includes 4 bytes of EDC data and 8 logical sectors (or 4 KB) are assembled into a mapping unit 320. A 4-byte mapping unit EDC 326 can be generated, which results in a 28 byte savings as compared to the aggregate size of EDC data (32 bytes) for the host data units in the payload. In some embodiments, this saving of space allows for including metadata 322 into the mapping unit 320 without taking up any additional space. In some embodiments, mapping unit EDC 326 is seeded by the starting logical address of the payload.

In some embodiments, mapping units 320 are compressed, and optionally encrypted, to produce one or more compressed mapping units 330 as discussed above. This can be performed by the compression and encryption module 220. A compressed mapping unit, such as mapping units 331, 337, or 338, includes compressed payload 334 (corresponding to the compressed mapping unit), mapping unit metadata 332, and mapping unit EDC 336, which can be the same as EDC 326. Mapping unit metadata 332 can include the following information: payload type (e.g., compressed or uncompressed), count (or number) of host data units in the compressed payload, logical addresses of one or more host data units in the compressed payload, and compressed payload length. In other embodiments, metadata 332 can include additional or alternative fields. Because compression produces variable sized data, compressed payload length field can be different for two or more different compressed mapping units, such as compressed mapping units 331, 337, and 338. In some embodiments, when sequential host data units are assembled into a mapping unit and into the compressed payload, the logical address of the first host data unit in the compressed payload and the host data unit size are sufficient to describe all host data in the compressed payload.

In some embodiments, when encryption is performed after compression, the compressed payload 334 and the mapping unit EDC 336 are encrypted. The metadata 332 is not encrypted or compressed. The metadata 332 can describe the contents of compressed payload, including describing logical addresses associated with host data in the compressed payload. Because in some embodiments, the host system 110 provides the decryption and/or encryption key(s) to the data storage system 120, not encrypting the metadata 332 allows the data storage system to manipulate compressed payload for various background or housekeeping tasks without having to perform decryption first. For example, the data storage system 120 can perform garbage collection without having to obtain the decryption key(s) from the host system 110. Garbage collection can include omitting or removing from a virtual storage unit one or more mapping units having invalid data. For example, suppose that a virtual storage unit includes mapping units for host data units corresponding to 512-byte logical sectors 0-7. Suppose further that as a result of host system activity, host data stored in logical sector 3 is updated, thereby making data in the virtual storage unit corresponding to logical sector 3 invalid. Garbage collection operation can create a new virtual storage unit that includes mapping units corresponding to logical sectors 0-2 and 4-7. As another example, the data storage system 120 can repack compressed payload without the decryption key(s). Repacking can include defragmentation of compressed payload, such as assembling partial mapping units into full mapping units, format conversion, such as storing virtual storage unit payload in a virtual storage unit of a different size for storage on different type of media, and the like. Defragmentation can include reordering the mapping units for host data units in a virtual storage unit. For example, suppose that a virtual storage unit includes mapping units for host data units corresponding to 512-byte logical sectors 0, 1, 3, 2, and 4-7. Defragmentation operation can reorder the mappings units in the virtual sector so that the mapping units are arranged in the order corresponding to host data units for logical sectors 0-7. In some embodiments, defragmentation can be performed in conjunction with garbage collection. For example, suppose that a virtual storage unit includes mapping units for host data units corresponding to 512-byte logical sectors 0, 1, 2, 4, 3, and 5-7. Suppose further that as a result of host system activity, host data stored in logical sector 2 is updated, thereby making data in the virtual storage unit corresponding to logical sector 2 invalid. Performing garbage collection in conjunction with defragmentation can create a new virtual storage unit that includes mapping units corresponding to logical sectors 0, 1, 3, 4, 5, 6, and 7 in that order. In some embodiments, the metadata 332 is encrypted and/or compressed.

In some embodiments, partial, full, and/or multiple compressed/uncompressed mapping units are assembled into virtual storage units 340 by one or more virtual storage streams (as described below). Assembling can be performed by the virtual storage unit module 230. In some embodiments, virtual storage units can include one or more of the following: uncompressed mapping unit(s) (full and/or partial), parts (split/remainder parts) of one or more compressed mapping units split across several virtual storage units, compressed mapping unit(s), filler data, and so on. In the illustrated example, the virtual storage unit 340 comprises one or more full or partial compressed mapping units 344 (collectively making up compressed payload), optional filler data 346 so that the size of the virtual storage unit is aligned with the size of a corresponding media storage unit, virtual storage unit metadata 342, and virtual storage unit EDC 348 determined for the contents of the virtual storage unit. Virtual storage unit metadata 342 can include the following information: virtual storage unit logical address for identifying the physical location of the virtual storage unit in the media 140, offset within the virtual storage unit of metadata field of the first compressed mapping unit in the compressed payload, and a sequence number of the virtual storage unit (or another form of a timestamp). In other embodiments, metadata 342 can include additional or alternative fields.

In some embodiments, returning stored data to the host system 110 comprises performing the inverse of the operations associated with writing data. In response to a read data command received from the host system, the command including logical addresses for the host data to be retrieved, the virtual storage unit module 230 identifies or locates in the media 140 (and/or in the buffer 132) one or more virtual storage units 340 with the host data to be retrieved. In some embodiments, the virtual unit storage unit module 230 utilizes a mapping table (or another suitable data structure) that reflects associations between the logical addresses used by the host system 110 for addressing data stored in the data storage system 120 and virtual storage units storing data associated with the logical addresses. The virtual storage unit module 230 can also use virtual storage unit metadata 342 to identify and retrieve from the media (and/or from the buffer) virtual storage units with the host data to be retrieved.

Using the metadata 332, the virtual storage unit module 230 identifies one or more compressed mapping units from the retrieved one or more virtual storage units, the one or more compressed mapping units containing host data to be retrieved. In some embodiments, a retrieved virtual storage unit can include one or more compressed mapping units that contain host data to be retrieved as well as one or more compressed mapping units that do not contain sought after host data. This classification can be performed using the metadata fields of the compressed mapping units. In such cases, one or more mapping units that do not contain host data to be retrieved are skipped, thereby improving efficiency of the data transfer operation. For example, suppose that the host system 110 requested host data corresponding to logical sector 3, but a retrieved mapping unit contains host data corresponding to logical sectors 0-7. The data storage system can return host data corresponding only to logical sector 3. As another example, suppose that the host system 110 requested host data corresponding to logical sectors 0-7, and a first retrieved mapping unit contains host data corresponding to logical sectors 0-7. Suppose further that a second mapping unit contains a "fresh" (or latest) copy of host data corresponding to logical sector 3. The data storage system can return host data contained in the first mapping unit for logical sectors 0-2 and 4-7 (thereby skipping host data for logical sector 3 contained in the first mapping unit) and return host data contained in the second mapping unit for logical sector 3. Data compression and encryption module 220 decrypts (if the data is encrypted) and decompresses (if the data is compressed) one or more compressed mapping units that contain host data to be retrieved. Mapping unit module 210 unpacks host data to be retrieved from the obtained one or more mapping units. Host data to be retrieved is returned to the host system 110. In some embodiments, mapping unit metadata 322 is used to ensure that correct data is returned to the host system 110.

In some embodiments, multiple read/write data streams or channels 350 are configured to handle multiple host write and/or read data streams, which can provide consecutive and/or random sequences of host data units. When the host system 110 writes data, write data streams 350 can assemble host data units into one or more mapping units 320. For example, suppose that the host system 110 is writing host data units for logical sectors 0, 100, 1, 101, 2, 102, 3, 103, etc. That is, the host system 110 is writing two interleaved, sequential host write data streams: 0, 1, 2, 3, etc. (host write data stream 1) and 100, 101, 102, 103, etc. (host write data stream 2). Host write data streams 1 and 2 can be assigned to write data streams 1 and 2 respectively. Write data streams 1 and 2 de-interleave host data and assemble host data into mapping units (full and/or partial). Write data streams 1 and 2 can operate independently of each other. Write data streams 1 and 2 can retain or maintain allocated resources, such as memory, while the host system 110 continues to write sequential data processed by the streams. This can increase efficiency as context switches are minimized. In some embodiments, write data streams 350 utilize memory organized as a FIFO. For example, each write data stream can include a separate FIFO. In other embodiments, write data streams 350 utilize alternative and/or additional data structures.

In some embodiments, mapping units 320 constructed by the write data streams 350 are compressed and, optionally, encrypted by a compression/encryption module 360, which can correspond to the data compression module 222. In some embodiments, one or more mapping units 320 constructed by the write data streams 350 are not compressed. For example, partial mapping units may not be compressed, as is illustrated by the bypass 335. As explained above, the compression/encryption module 360 can produce compressed mapping units 330 (with compressed or uncompressed payload). Compressed mapping units can be assembled into virtual storage units 340 by the virtual storage unit module 370, which can correspond to the virtual storage unit constructor 232. In some embodiments, the write data streams 350, compression/encryption module 360, and virtual storage unit module 370 operate on data stored in the buffer 132 and store data back in the buffer 132.

In some embodiments, any suitable number of write data streams 350 is utilized. The number of write data streams 350 may be balanced against the capacity of the buffer 132 and availability of system resources. In some embodiments, one or more write data streams 350 are reserved for background operations, such as garbage collection, bad block management, wear leveling, etc. In some embodiments, different write data streams 350 can be reserved for background operations for different media types. For example, a write data stream can be reserved for background operations for the solid-state memory 150 and another write data stream can be reserved for background operations for the magnetic storage 160.

In some embodiments, host data is retained or maintained in a write data stream for a period of time. For example, suppose that the host system 110 is writing host data units for 512-byte logical sectors 0, 5, 3, etc. and 4 KB mapping units are utilized. This host write data stream can be assigned to write data stream 1. In one embodiment, these host data units can be kept in the write data stream 1 FIFO (or another suitable data structure) so that when the host system 110 provides host data units for logical sectors 1, 2, 4, 6, and 7, a full mapping unit with host data units for logical sectors 0-7 is constructed.

In some embodiments, the context of one or more write data streams 350 are saved and restored when desired. Continuing the above example, write data stream 2, which is designated for partial mapping units, creates partial mapping units: the first for host data associated with logical sector 0, the second for host data associated with logical sector 5, and the third for host data associated with logical sector 0. These partial mapping units can be assembled into a virtual storage unit, which can be stored in the buffer 132. In some embodiments, an offset for next host data unit in the sequence of host data units within the assembled virtual storage unit can be noted or saved along with the state of the mapping unit EDC calculation. The context of write data stream 2 (e.g., host data units for logical sectors 0, 3, and 5) is saved, and resources allocated to write data stream 2 are deallocated. When the host system 110 provides host data units for logical sectors 1, 2, 4, 6, and 7, the context of write data stream 2 is restored and these new host data units are assigned to a write data stream. The assigned write data stream can be a stream different from write data stream 2. The assigned write data stream can integrate the first, second, and third partial mapping units along with host data units for logical sectors 1, 2, 4, 6, and 7 into a full mapping unit (having 4 KB payload). In one embodiment, where there are N streams that could be supported by hardware, the saving of contexts serves as a virtual extension of that capacity so that M number of streams (M>N) can be tracked and processed.

In some embodiments, a virtual storage unit stream integrates host data units for logical sectors 1, 2, 4, 6, and 7 into the virtual storage unit containing host data units for logical sectors 0, 3, and 5. This can be efficiently performed by utilizing the saved offset and the state of the EDC calculation. In other embodiments, host data units for logical sectors 1, 2, 4, 6, and 7 are assembled in a fourth partial mapping unit. A write data stream can integrate the first, second, third, and fourth mapping units into a full mapping unit, which can be compressed and assembled into a virtual storage unit. When the virtual storage unit is complete (or aligned with a media storage unit), the virtual storage unit can be stored in the solid-state memory 150 or in the magnetic storage 160.

In some embodiments, a full mapping unit can be completed in a write data stream. For example, suppose that the host system 110 writes host data for logical sectors 0-3. This data can be assigned to a write data stream. Suppose that the host system 110 continues to write data. The assigned write data stream can accumulate host data until it is able to assemble a full mapping unit. Continuing the above example, the assigned write data stream can assemble a full mapping unit when the host system 110 writes host data units for logical sectors 4-7. The assigned write data stream assembles host data for logical sectors 0-3 with host data for logical sectors 4-7 into a full mapping unit, which can be compressed, stored in a virtual storage unit, and written to the solid-state memory 150 or in the magnetic storage 160.

In some embodiments, one or more partial mapping units can be combined into a full mapping unit. For example, suppose that a first partial mapping unit includes host data for logical sectors 0-3 and a second partial mapping unit includes host data for logical sectors 4-7. The first and second partial mapping units can be combined into a full mapping unit, which may then be compressed, stored in a virtual storage unit, and written to the solid-state memory 150 or in the magnetic storage 160. In one embodiment, non-sequential data is combined into a full mapping unit.

In some embodiments, a partial mapping unit can be completed as a full mapping unit. For example, suppose that a partial mapping unit includes host data for logical sectors 0-3. At a later time, the host system 110 writes host data for logical sectors 4-7. The partial mapping unit payload and this host data can be combined into a full mapping unit, which may then be compressed, and stored in a virtual storage unit. When the virtual storage unit is complete (or aligned with a media storage unit), the virtual storage unit is written to the solid-state memory 150 or in the magnetic storage 160. In one embodiment, the partial mapping unit payload and the host data for logical sectors 4-7 is assembled into a full mapping unit in a write data stream not designated for partial mapping units. In one embodiment, non-sequential data is combined into a full mapping unit.

In some embodiments, mapping unit data can be updated. For example, a partial mapping unit can be integrated with a full mapping unit. Suppose that 4 KB mapping units and virtual storage units are used, and that host data units correspond to logical 512-byte sectors. Suppose further that a virtual storage unit includes compressed payload for host data units corresponding to logical sectors 0-7. Suppose also that the host system writes new host data for logical sector 5. This host data can be handled by a write data stream (e.g., write data stream designated for partial mapping units), and a partial mapping unit is constructed. This partial mapping unit can be integrated with the virtual storage unit that includes host data for logical sectors 0-7. The virtual storage unit can be located in the manner described above, and updated host data units for logical sector 5 is used to replace outdated host data for that logical sector in the virtual storage unit.

In some embodiments, multiple read data streams 350 or channels are configured to handle multiple host read streams, which can retrieve consecutive and/or random sequences of host data units. Reading data can comprise performing the inverse of the operations associated with writing data. For example, suppose that the host system 110 is reading host data units for logical sectors 0, 100, 1, 101, 2, 102, 3, 103, etc. That is, the host system 110 is reading two interleaved, sequential host read data streams: 0, 1, 2, 3, etc. (host read data stream 1) and 100, 101, 102, 103, etc. (host read data stream 2). Host read data streams 1 and 2 can be assigned to read data streams 1 and 2 respectively. Virtual storage units with data requested by host data read stream 1 are located and unpacked by the virtual storage unit module 370, decrypted (if needed) and decompressed (if needed) by the decryption/decompression module 360, and provided to read data stream 1. Similarly, virtual storage units with data requested by host data read stream 2 are located and unpacked by the module 370, decrypted (if needed) and decompressed (if needed) by the module 360, and provided to read data stream 2. Read data streams 1 and 2 return host data to the host system 110 in the format expected by the host system. Read data streams 1 and 2 can operate independently of each other. In some embodiments, read data streams can be configured with one or more above-described properties of write data streams. In one embodiment, the context of read data streams 350 can be saved and restored when desired.

Figure 4A:
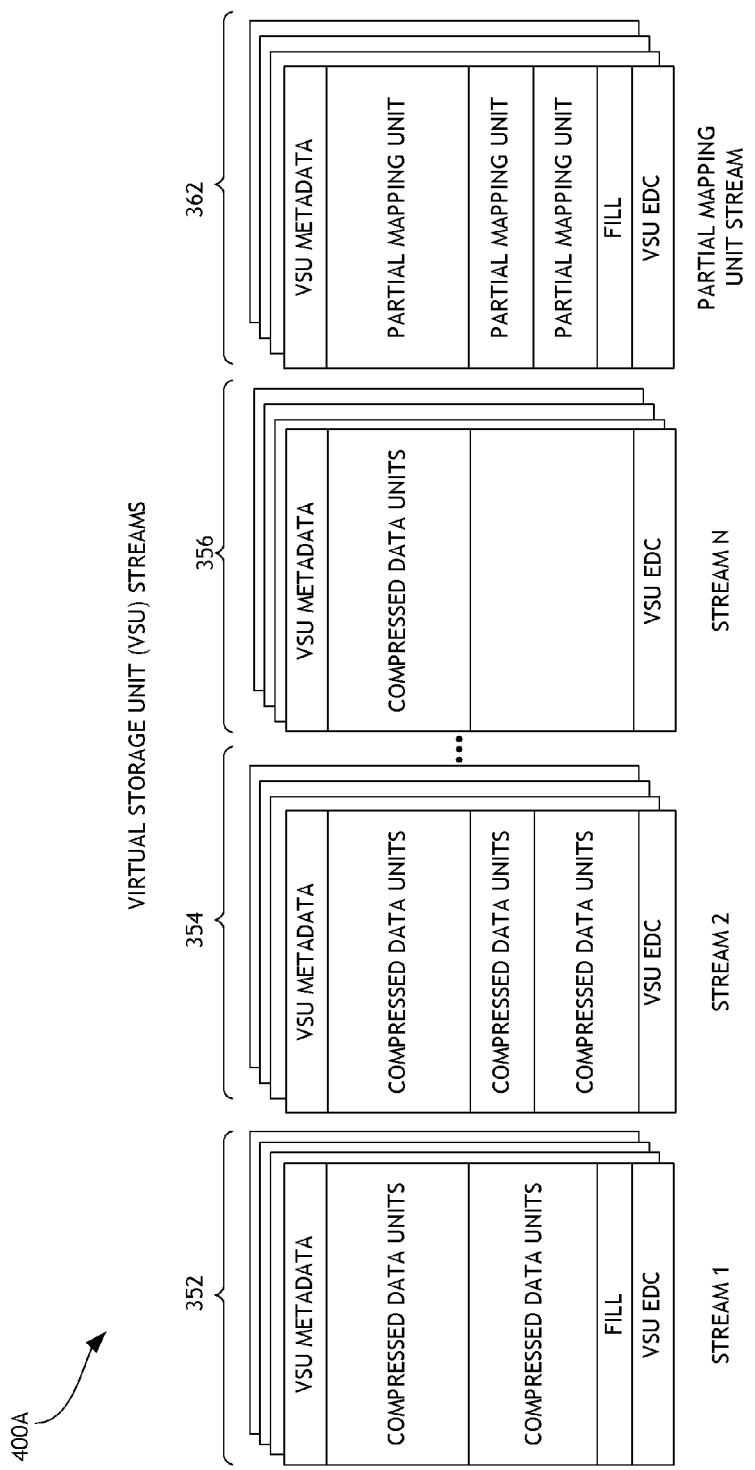
FIG. 4A illustrates multiple virtual storage streams utilized by a data storage system according to some embodiments of the invention.

FIG. 4A illustrates multiple virtual storage streams 400A utilized by the data storage system 120 according to some embodiments of the invention. Virtual storage streams 352, 354, 356, and 362 are configured to handle multiple host write and/or read data streams, which can provide consecutive and/or random sequences of host data units. In some embodiments, virtual storage streams are configured to handle mapping units from write data streams and provide virtual mapping units to read data streams. Any suitable number of virtual storage streams can be utilized depending on the available resources of the data storage system 120. In some embodiments, partial mapping units are assigned to a dedicated partial mapping unit virtual storage stream 362. In other embodiments, partial mapping units are assigned to any virtual storage stream. In one embodiment, the streams shown in FIG. 4A are implemented in hardware.

In some embodiments, a first de-interleaved sequence of host data units is assigned to virtual storage stream 352, which assembles compressed mapping units into a first stream of virtual storage units. A second de-interleaved sequence of host data units is assigned to virtual storage stream 354, which assembles compressed mapping units into a second stream of virtual storage units. Virtual storage streams 352 and 354 can operate independently of each other. In some embodiments, as explained above, context of one or more virtual storage streams is saved and restored when desired.

In some embodiments, one or more virtual storage units are retained for a period of time. For example, suppose that the host system 110 is reading 512-byte logical sectors 0-4, 100-104, 5-7, 105-107, etc. This corresponds to a first host read data stream 0-4, 5-7, etc. and a second host read data stream 100-104, 105-107, etc. Suppose that virtual storage stream 352 is assigned to handle the first host read data stream and virtual storage stream 354 is assigned to handle the second host read data stream. Virtual storage stream 352 can locate a virtual storage unit that contains host data units for logical sectors 0-4 and 5-7. Using compressed mapping unit metadata as explained above, the host data for logical sectors 0-4 can be unpacked, decompressed (if needed), and returned to the host system. Rather than discarding the virtual storage unit, the virtual storage stream 352 can retain the virtual storage unit so that host data for logical sectors 5-7 is available when the host system 110 requests it. This can provide for more efficient data retrieval.

Figure 4B:
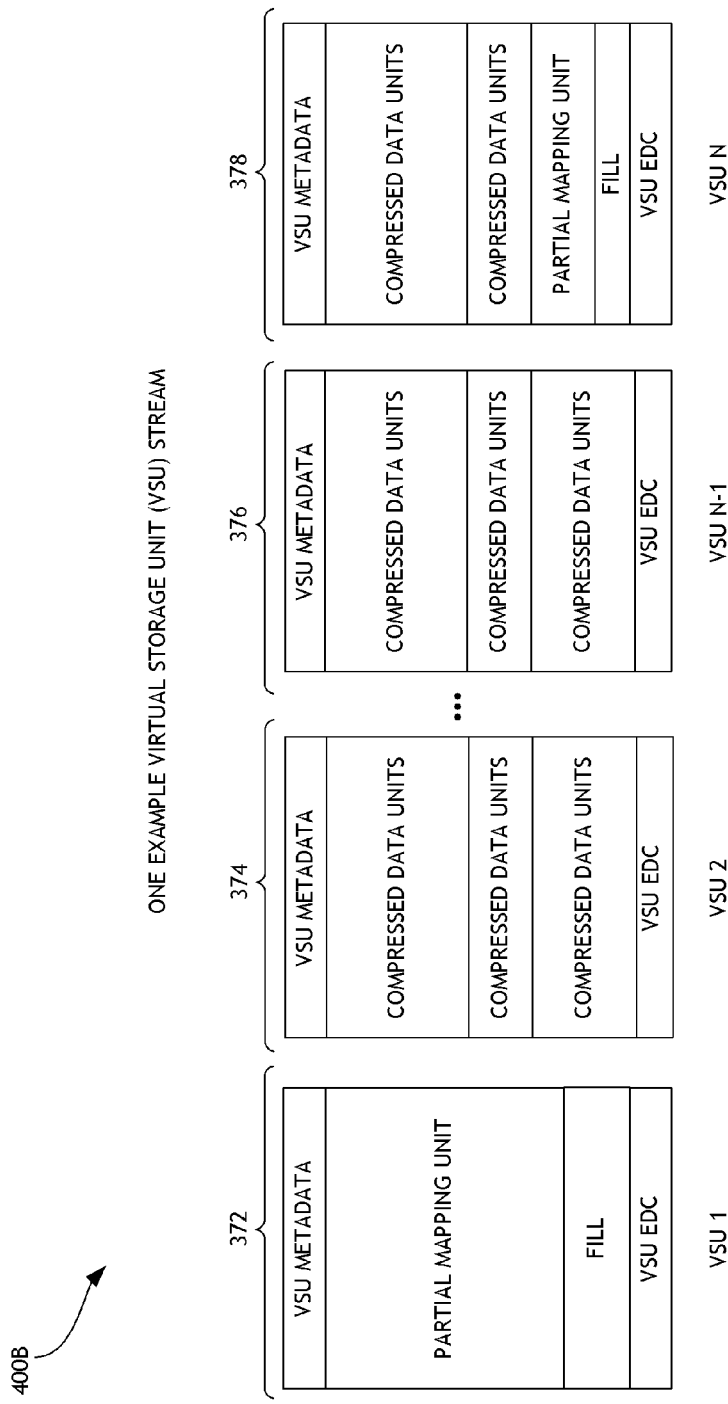
FIG. 4B illustrates a virtual storage stream utilized by a data storage system according to some embodiments of the invention.

FIG. 4B illustrates a virtual storage stream 400B utilized by the data storage system 120 according to some embodiments of the invention. In one embodiment. the stream 400B is configured to handle host write and/or read data stream that writes and/or retrieves sequential data. For example, suppose that the host system 110 is writing host data for logical sectors 4-69. The stream 400B can assemble a first partial mapping unit with host data units corresponding to logical sectors 4-7. This partial mapping unit can be stored in a virtual storage unit 372, VSU 1, in order to allow the virtual storage stream 400B to handle subsequent host data. Next, the stream 400B can assemble aligned host data units corresponding to logical sectors 8-63 into compressed mapping units and store the compressed mapping units into complete virtual storage units 374 through 376 (VSU 2 through VSU N-1). The stream 400B can assemble a second partial mapping unit with host data units for the remaining logical sectors 64-69. This partial mapping unit can be stored in a virtual storage unit 378, VSU N. In one embodiment, depending on the host pattern, virtual storage units 372 and 378 containing partial mapping units may not be generated. For example, the host system 110 could be programming fully aligned host data, such as host data units corresponding to logical sectors 0-63 so that the stream 400B assembles virtual storage units with full mapping units. In one embodiment, the data storage system 120 implements any suitable number of virtual storage streams 400B depending on the available resources. In one embodiment, the stream 400B (or multiple streams) is implemented in hardware.

Process for Writing Data

Figure 5:
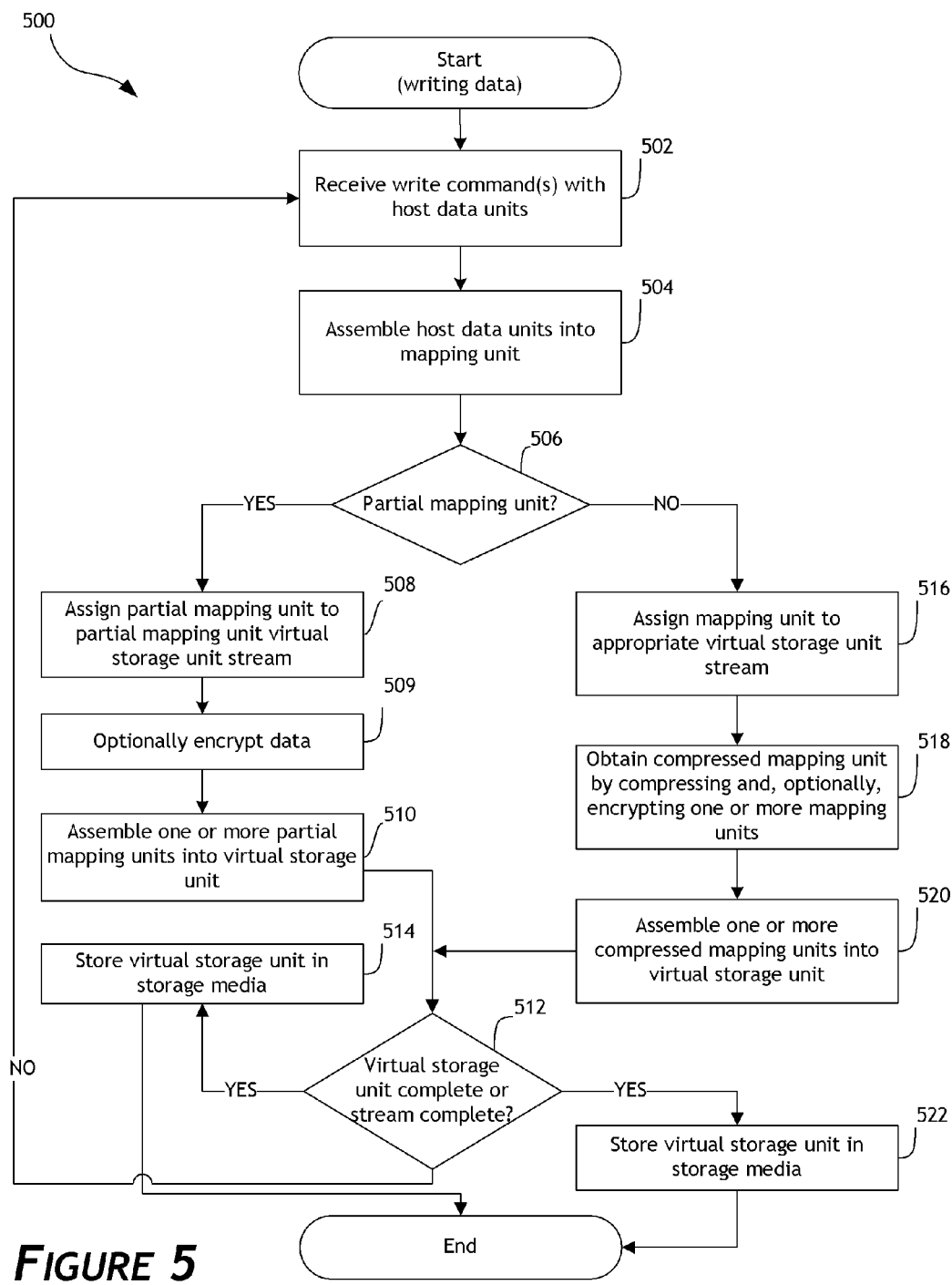
FIG. 5 is a flow diagram illustrating a process of storing data in a data storage system according to some embodiments of the invention.

FIG. 5 is a flow diagram illustrating a process 500 of writing or programming data in the data storage system 120 according to some embodiments of the invention. The illustrated process can be executed by the controller 130 and/or the compression and formatting module 134. In block 502, the process 500 receives one or more write data commands from a host system 110. A write data command specifies one or more host data units to be written to corresponding logical addresses, which can be assigned to a write data stream. Host data units have fixed size. The process 500 transitions to block 504 where it assembles one or more host data units into one or more mapping units. As explained above, the one or more mapping units can be full or partial mapping units. In one embodiment, the process 500 assembles the one or more host data units into one or more full mapping units provided that the one or more host data units are aligned with a memory data unit (e.g., sector, page, etc.). Otherwise, the process 500 stores the one or more host data units into one or more partial mapping units. In some embodiments, the process 500 assembles the one or more host data units into full and partial mapping units. In block 506, the process 500 determines whether a current assembled mapping unit is a partial mapping unit. If the mapping unit is a full mapping unit, the process 500 transitions to block 516 where it assigns the mapping unit to an appropriate virtual storage stream. In block 518, the process compresses the host data units of the mapping unit, thereby obtaining compressed mapping units, which are variable sized due to the compression operation. The process 500 optionally encrypts the compressed data. In block 520, the process 500 assembles the one or more compressed mapping units into one or more sized virtual storage units. The process 500 transitions to block 512, where it determines whether the current virtual storage unit is complete (or aligned with a media storage unit) or whether the host stream is deemed by the process to be complete (e.g., host stops writing sequential data for a sufficient amount of time so that a time out occurs). If either one of these conditions are met, the process 500 transitions to block 522, where the process stores the current virtual storage unit in the media 140. In one embodiment, if the host stream is complete, the process 500 can add filler data to the current virtual storage unit to complete it and store the completed virtual storage unit in the media 140. If the process 500 determines in block 512 that the current virtual storage unit is not complete and the host stream is not deemed to be complete, the process transitions to block 502 where it continues to process host data.

If in block 506 the process 500 determines that the current assembled mapping unit is a partial mapping unit, the process transitions to block 508 where it assigns the partial mapping unit to a partial mapping unit virtual storage stream. As explained above, in some embodiments partial mapping units are not compressed in order to improve defragmentation efficiency. In block 509, the process 500 optionally encrypts partial mapping unit data. In block 510, the process 500 assembles one or more partial mapping units into a virtual storage unit. The process 500 transitions to block 512, where it determines whether the virtual storage unit is complete (or aligned with a media storage unit) or whether the host stream is deemed by the process to be complete (e.g., host stops writing sequential data for a sufficient amount of time so that a time out occurs). If either one of these conditions are met, the process 500 transitions to block 514 where it stores the virtual storage unit in the media 140. In one embodiment, if the host stream is complete, the process 500 can add filler data to the virtual storage unit to complete it and store the completed virtual storage unit in the media 140. In some embodiments, the process 500 does not perform the operation of block 514 while there is sufficient space in the buffer 132. If the process 500 determines in block 512 that the virtual storage unit is not complete and the host stream is not deemed to be complete, the process transitions to block 502 where it continues to process host data.

Conclusion

Disclosed approaches for multiple stream compression and formatting of data for data storage systems can increase capacity, reliability, and performance. In some embodiments, storing compressed sequential host data in consecutive or neighboring memory locations on the media improves at least the read throughput. Because read rates are increased, resume time of the host system can be decreased. This allows the host system to "wake up" faster following power on, reboot, sleep, and/or hibernate events. In some embodiments, write or program throughput is increased because compressed data which is smaller in size is stored on the media. In addition, storing compressed data increases the effective capacity of the media. This can also reduce costs as, for example, less solid-state cache memory may be needed, and increase cache hit rates and overall performance. In some embodiments, particularly for solid-state memory media, lower write amplification and increased overprovisioning are achieved.

Other Variations

Those skilled in the art will appreciate that in some embodiments, additional or alternative modules can be used to perform compression and formatting. Mapping units, compressed mapping units, and/or virtual storage units can include additional or alternative fields. The actual steps taken in the disclosed processes, such as the processes illustrated in FIG. 5, may differ from those shown in the figure. Additional system components can be utilized, and disclosed system components can be combined or omitted. Depending on the embodiment, certain of the steps described above may be removed, others may be added.

While certain embodiments have been described, these embodiments have been presented by way of example only, and are not intended to limit the scope of the protection. Indeed, the novel methods and systems described herein may be embodied in a variety of other forms. Furthermore, various omissions, substitutions and changes in the form of the methods and systems described herein may be made without departing from the spirit of the protection. The accompanying claims and their equivalents are intended to cover such forms or modifications as would fall within the scope and spirit of the protection. For example, the systems and methods disclosed herein can be applied to hard disk drives, hybrid hard drives, and the like. In addition, other forms of storage (e.g., DRAM or SRAM, battery backed-up volatile DRAM or SRAM devices, EPROM, EEPROM memory, etc.) may additionally or alternatively be used. As another example, the various components illustrated in the figures may be implemented as software and/or firmware on a processor, ASIC/FPGA, or dedicated hardware. Also, the features and attributes of the specific embodiments disclosed above may be combined in different ways to form additional embodiments, all of which fall within the scope of the present disclosure. Although the present disclosure provides certain preferred embodiments and applications, other embodiments that are apparent to those of ordinary skill in the art, including embodiments which do not provide all of the features and advantages set forth herein, are also within the scope of this disclosure. Accordingly, the scope of the present disclosure is intended to be defined only by reference to the appended claims.

What is claimed is:

1. A data storage system comprising:
   non-volatile solid-state memory (NVM) configured to store a plurality of memory data units, a memory data unit being a unit of storage in the NVM;
   a buffer; and
   a controller configured to process a plurality of write data commands received from a host system, the commands associated with a plurality of host data units associated with a plurality of logical addresses, the controller further configured to:
   identify, within the plurality of host data units, a first set of sequential host data units that are associated with sequential logical addresses, the first set of host data units comprising a payload;
   assemble the payload into a first mapping unit, wherein the first mapping unit is aligned with a memory data unit;
   compress the first mapping unit into a first compressed payload, wherein the first compressed payload is not aligned with the memory data unit;
   based at least in part on a logical address associated with the first compressed payload, select a first data storage stream from a plurality of data storage streams;
   associate the first compressed payload with the first data storage stream;
   assemble, within the first data storage stream, at least the first compressed payload into a first storage unit, wherein the first storage unit is aligned with the memory data unit; and
   store the first storage unit in the NVM.

2. The data storage system of claim 1, wherein the controller is further configured to:
   assemble a second sequential set of host data units into a second mapping unit;
   based at least in part on a logical address associated with the second sequential set of host data units, select a second data storage stream from the plurality of data storage streams; and
   associate the second mapping unit with the second data storage stream,
   wherein the host data units of the first set of host data units are not sequential with the host data units of the second set of host data units.

3. The data storage system of claim 1, wherein each data storage stream is configured to be associated with a different sequence of logical addresses than the other data storage streams.

4. The data storage system of claim 1, wherein the controller is further configured to save a context of the first data storage stream and restore the context in response to receiving an additional write data command from the host system, the additional write data command associated with additional one or more logical addresses that are sequential with the plurality of logical addresses associated with the first set of host data units.

5. The data storage system of claim 1, wherein, in response to determining that the payload is not aligned with the memory data unit, the controller is further configured to:

assemble the first set of sequential host data units into a partial mapping unit;

select a second data storage stream from a plurality of data storage streams that is different from the first data storage stream, wherein the second data storage stream is designated for assembling partial mapping units;

associate the partial mapping unit with the second data storage stream;

assemble, within the second data storage stream, at least the first mapping unit into a second storage unit, wherein the second storage unit is not aligned with the memory data unit; and store the second storage unit in the buffer.

6. The data storage system of claim 1, wherein, in response to determining that the payload is not aligned with the memory data unit, the controller is further configured to:

assemble the payload along with at least one additional payload into a second payload, wherein the at least one additional payload comprises one or more host data units and the second payload is aligned with the memory data unit;

compress the second payload into a second compressed payload;

assemble at least the second compressed payload into a second storage unit; and store the second storage unit in the NVM when the second storage unit is complete.

7. The data storage system of claim 6, wherein controller is further configured to pad the second storage unit with filler data, a size of the filler data selected such that the second storage unit is aligned with the memory data unit.

8. The data storage system of claim 1, wherein, in response to determining that the payload is not aligned with the memory data unit, the controller is further configured to:

accumulate additional one or more host data units;

assemble the payload and additional one or more host data units into a second mapping unit, wherein an aggregate of the payload and additional one or more host data units is aligned with the memory data unit;

compress the second mapping unit into a second compressed payload;

assemble at least the second compressed payload into a second storage unit; and store the second storage unit in the NVM.

9. The data storage system of claim 8, wherein the controller is further configured to:

accumulate the additional one or more host data units within the first data storage stream; and assemble at least the aggregate of the first compressed payload into the second storage unit within the first data storage stream.

10. The data storage system of claim 1, wherein the controller is further configured to process a plurality of read data commands received from the host system, a read command associated with a range of logical addresses corresponding to a memory data unit comprising a plurality of host data units, the controller further configured to:

separate the plurality of logical address ranges into a plurality of sets of sequential logical address ranges; and associate a first set of sequential logical address ranges with a first read data stream of a plurality of read data streams.

11. The data storage system of claim 10, wherein the controller is further configured to associate a second set of sequential logical addresses with a second read data stream of the plurality of read data streams, and wherein the first set of logical addresses is not consecutive with the second set of logical addresses.

12. The data storage system of claim 10, wherein the controller is further configured to:

identify and retrieve one or more storage units stored in the NVM that store a plurality of host data units associated with the first set of logical addresses;

identify one or more compressed mapping units of the retrieved one or more storage units, wherein combined compressed payloads of the one or more compressed mapping units comprise at least the plurality of host data units associated with the first set of logical addresses;

decompress the compressed payloads of the identified one or more compressed mapping units; and return the plurality of host data units associated with the first set of logical addresses to the host system.

13. In a data storage system comprising solid-state non-volatile memory (NVM) configured to store a plurality of memory data units, a memory data unit being a unit of storage in the NVM and a buffer, a method comprising:

in response to receiving a plurality of write data commands from a host system, the commands associated with a plurality of host data units associated with a plurality of logical addresses:

identifying, within the plurality of host data units, a first set of sequential host data units that are associated with sequential logical addresses, the first set of host data units comprising a payload;

assembling the payload into a first mapping unit, wherein the first mapping unit is aligned with a memory data unit;

compressing the first mapping unit into a first compressed payload, wherein the first compressed payload is not aligned with the memory data unit;

based at least in part on a logical address associated with the first compressed payload, selecting a first data storage stream from a plurality of data storage streams;

associating the first compressed payload with the first data storage stream;

assembling, within the first data storage stream, at least the first compressed payload into a first storage unit, wherein the first storage unit is aligned with the memory data unit; and storing the first storage unit in the NVM, wherein the method is performed by a controller in the data storage system.

14. The method of claim 13, further comprising:

assembling a second sequential set of host data units into a second mapping unit;

based at least in part on a logical address associated with the second sequential set of host data units, selecting a second data storage stream from the plurality of data storage streams; and associating the second mapping unit with the second data storage stream, wherein the host data units of the first set of host data units are not sequential with the host data units of the second set of host data units.

15. The method of claim 13, wherein each data storage stream is configured to be associated with a different sequence of logical addresses than the other data storage streams.

16. The method of claim 13, further comprising saving a context of the first data storage stream and restoring the context in response to receiving an additional write data command from the host system, the additional write data command associated with additional one or more logical addresses that are sequential with the plurality of logical addresses associated with the first set of host data units.

17. The method of claim 13, further comprising:

in response to determining that the payload is not aligned with the memory data unit:

assembling the first set of sequential host data units into a partial mapping unit;

selecting a second data storage stream from a plurality of data storage streams that is different from the first data storage stream, wherein the second data storage stream is designated for assembling partial mapping units;

associating the partial mapping unit with the second data storage stream;

assembling, within the second data storage stream, at least the first mapping unit into a second storage unit, wherein the second storage unit is not aligned with the memory data unit; and storing the second storage unit in the buffer when the second storage unit is complete.

18. The method of claim 13, further comprising:
in response to determining that the payload is not aligned with the memory data unit:
assembling the payload along with at least one additional payload into a second payload, wherein the at least one additional payload comprises one or more host data units and the second payload is aligned with the memory data unit;
compressing the second payload into a second compressed payload;
assembling at least the second compressed payload into a second storage unit; and
storing the second storage unit in the NVM.

19. The method of claim 18, further comprising padding the second storage unit with filler data, a size of the filler data selected such that the second storage unit is aligned with the memory data unit.

20. The method of claim 13, further comprising:
in response to determining that the payload is not aligned with the memory data unit:
accumulating additional one or more host data units;
assembling the payload and additional one or more host data units into a second mapping unit, wherein an aggregate of the payload and additional one or more host data units is aligned with the memory data unit;
compressing the second mapping unit into a second compressed payload;
assembling at least the second compressed payload into a second storage unit; and
storing the second storage unit in the NVM.

21. The method of claim 20, wherein the accumulating comprises accumulating the additional one or more host data units within the first data storage stream, and the assembling comprises assembling at least the aggregate of the first compressed payload into the second storage unit within the first data storage stream.

22. The method of claim 13, further comprising:
in response to receiving a plurality of read data commands from the host system, a read command associated with a range of logical addresses corresponding to a memory data unit comprising a plurality of host data units:
separating the plurality of logical address ranges into a plurality of sets of sequential logical address ranges; and
associating a first set of sequential logical address ranges with a first read data stream of a plurality of read data streams.

23. The method of claim 22, further comprising associating a second set of sequential logical addresses with a second read data stream of the plurality of read data streams, wherein the first set of logical addresses is not consecutive with the second set of logical addresses.

24. The method of claim 22, further comprising:
identifying and retrieving one or more storage units stored in the NVM that store a plurality of host data units associated with the first set of logical addresses;
identifying one or more compressed mapping units of the retrieved one or more storage units, wherein combined compressed payloads of the one or more compressed mapping units comprise at least the plurality of host data units associated with the first set of logical addresses;
decompressing the compressed payloads of the identified one or more compressed mapping units; and
returning the plurality of host data units associated with the first set of logical addresses to the host system.

25. The data storage system of claim 1, wherein being aligned with the memory data unit comprises having a size that is an integer multiple of a size of the memory data unit.

26. The method of claim 13, wherein being aligned with the memory data unit comprises having a size that is an integer multiple of a size of the memory data unit.

* * * * *